United States Patent
Shizu

(10) Patent No.: US 11,955,864 B2
(45) Date of Patent: Apr. 9, 2024

(54) LINEAR MOTOR

(71) Applicant: OKUMA Corporation, Aichi (JP)

(72) Inventor: Tatsuya Shizu, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 17/591,669

(22) Filed: Feb. 3, 2022

(65) Prior Publication Data

US 2022/0247297 A1  Aug. 4, 2022

(30) Foreign Application Priority Data

Feb. 3, 2021 (JP) ................................ 2021-016003

(51) Int. Cl.
*H02K 41/03* (2006.01)

(52) U.S. Cl.
CPC .................... *H02K 41/031* (2013.01)

(58) Field of Classification Search
CPC ...... H02K 41/031; H02K 41/033; H02K 1/24; H02K 1/27; H02K 1/28
See application file for complete search history.

(56) References Cited

FOREIGN PATENT DOCUMENTS

| JP | 2006109639 A | * | 4/2006 | ............. H02K 1/04 |
| JP | 2006109639 A | | 4/2006 | |
| WO | WO-2020003341 A1 | * | 1/2020 | ............. H02K 1/04 |

OTHER PUBLICATIONS

English translation of JP-2006-109639-A (Year: 2006).*
English translation of WO-2020003341-A1 (Year: 2020).*

* cited by examiner

*Primary Examiner* — Ahmed Elnakib
*Assistant Examiner* — Joshua Kiel M Rodriguez
(74) *Attorney, Agent, or Firm* — CANTOR COLBURN LLP

(57) ABSTRACT

A linear motor includes a stator including a plurality of salient poles arranged at regular intervals in the Y-axis direction, and a mover movable in the Y-axis direction and facing the stator in the X-axis direction, in which the mover includes a plurality of teeth arranged in the Y-axis direction, three-phase alternate current windings wound around the teeth, a mover magnetic yoke that connects the plurality of teeth, permanent magnets each disposed in a gap between the teeth of identical phase, and magnetic flux barriers each embedded near the base of each tooth of the plurality of teeth, disposed completely within a width of each tooth in the X-axis direction, and spaced apart from the permanent magnet in the X-axis direction.

3 Claims, 5 Drawing Sheets

LINEAR MOTOR

CROSS REFERENCE TO RELATED APPLICATION

The present invention claims priority under 35 U.S.C. § 119 to Japanese Patent Application No. 2021-016003 filed on Feb. 3, 2021, the entire contents of which being incorporated herein by reference.

TECHNICAL FIELD

This specification discloses linear motors used in industrial machines such as machine tools.

BACKGROUND

Linear motors have been used in industrial machines such as machine tools for realizing high speed and high accuracy. Among such linear motors, some have realized low cost and are used particularly in long-stroked machines by disposing expensive permanent magnets on the mover side to thereby reduce the number of permanent magnets used.

FIG. 6 illustrates an example of a conventional linear motor. In FIG. 6, a stator 12 is formed by, for example, laminating magnetic steel plates. On the surface of the stator 12, salient poles 10 are arranged at pitch P so as to protrude from a magnetic yoke 21 of the stator. Like the stator 12, a mover 11 is also formed by laminating magnetic steel plates, and includes teeth 13 for U-phase, teeth 14 for V-phase, and teeth 15 for W-phase. The teeth 13, 14, and 15 are arranged such that they are displaced from each other by an electric angle of 120 degrees; that is, by one-third of pitch P of the salient poles 10 in the X-axis direction. Three-phase alternating current windings are wound around each of the teeth 13, 14, and 15. That is, a three-phase alternating current winding 16 for the U-phase is wound around the teeth 13, a three-phase alternating current winding 17 for the V-phase is wound around the teeth 14, and a three-phase alternating current winding 18 for the W-phase is wound around the teeth 15. A plurality of teeth among the teeth 13, 14, and 15 are arranged at one half of pitch P, with permanent magnets 19 disposed in gaps between the teeth. The permanent magnets 19 are arranged such that the magnetization direction of each permanent magnet 19 is opposite that of an adjacent permanent magnet 19. Arrows in FIG. 6 indicate the magnetization directions of the permanent magnets 19.

In such a linear motor, a long-stroke movable range can be achieved simply by repeatedly arranging stator blocks of a simple structure formed by laminating inexpensive electromagnetic steel plates. Furthermore, since the expensive permanent magnets 19 are arranged on the mover side to reduce the number of permanent magnets used, the production cost of the linear motor can be minimized.

A known linear motor includes a magnetic flux barrier 22 made of a non-magnetic material in the mover 11 to reduce the inductance of windings for the purpose of improving the responsiveness of the above-mentioned linear motor and increasing a thrust force in the high speed range. Such a linear motor is illustrated in FIGS. 7, 8, and 9 in which only a part of the mover 11 corresponding to one electric phase is illustrated and the stator 12 is omitted.

In FIG. 7, the magnetic flux barrier 22 is disposed between a mover magnetic yoke 20 and the teeth 13, 14, and 15, and the mover magnetic yoke 20 is separated from the teeth 13, 14, and 15.

In FIG. 8, the magnetic flux barrier 22 is disposed between the mover magnetic yoke 20 and the teeth 13, 14, and 15, with the mover magnetic yoke 20 connected to the teeth 13, 14, and 15 at two positions on both ends of the magnetic flux barrier 22 in the X-axis direction.

In FIG. 9, magnetic flux barriers 22 are disposed to connect to magnet insertion slots in which the permanent magnets 19 are inserted.

The above-mentioned conventional linear motors have presented drawbacks as described below.

In the linear motor illustrated in FIG. 7, the mover magnetic yoke 20 is separated from the teeth 13, 14, and 15 and provided as a separate part, causing an increase in the manufacturing cost of the linear motor and further causing an increase of thrust ripples due to deterioration of the assembly accuracy.

In the linear motors illustrated in FIGS. 7 and 8, since the magnetic flux barrier 22 is disposed between the mover magnetic yoke 20 and the teeth 13, 14, and 15, the Y-axis dimension of the mover 11 increases. To prevent this, the Y-axis dimension of the permanent magnets 19 needs to be reduced by the Y-axis dimension of the magnetic flux barrier 22, but this causes a decrease in thrust force per volume of the linear motor.

In the linear motor illustrated in FIG. 9, the magnetic flux barriers 22 block the effective magnetic flux into and out of the permanent magnets 19 at portions where the permanent magnets 19 contact the magnetic flux barriers 22. Accordingly, the magnetic flux of the permanent magnets 19 cannot be used effectively and the thrust force per volume of the linear motor is decreased.

CITATION LIST

PATENT DOCUMENT 1: JP 2006-109639 A

SUMMARY

A linear motor disclosed herein includes a stator including a plurality of salient poles arranged at regular intervals in a predetermined travel direction, and a mover movable in the travel direction and facing the stator in a facing direction orthogonal to the travel direction, in which the mover includes a plurality of teeth arranged in the travel direction, three-phase alternate current windings wound around the teeth, a mover magnetic yoke that connects the plurality of teeth, permanent magnets each disposed in a gap between the teeth of identical phase, and magnetic flux barriers each embedded near the base of each tooth of the plurality of teeth, disposed completely within a width of each tooth in the travel direction, and spaced apart from the permanent magnet in the travel direction.

In this case, the magnetic flux barriers may be disposed across the mover magnetic yoke and the teeth.

A dimension of the magnetic flux barriers in the facing direction may be larger than a dimension of the magnetic flux barriers in the travel direction of the mover.

Each magnetic flux barrier may be disposed at the center of the respective tooth in the travel direction of the mover.

According to the linear motor disclosed herein, the thrust force per volume of the linear motor can be increased.

BRIEF DESCRIPTION OF DRAWING

Embodiments of the present disclosure will be described based on the following figures, wherein.

DESCRIPTION OF EMBODIMENTS

Figure 1:
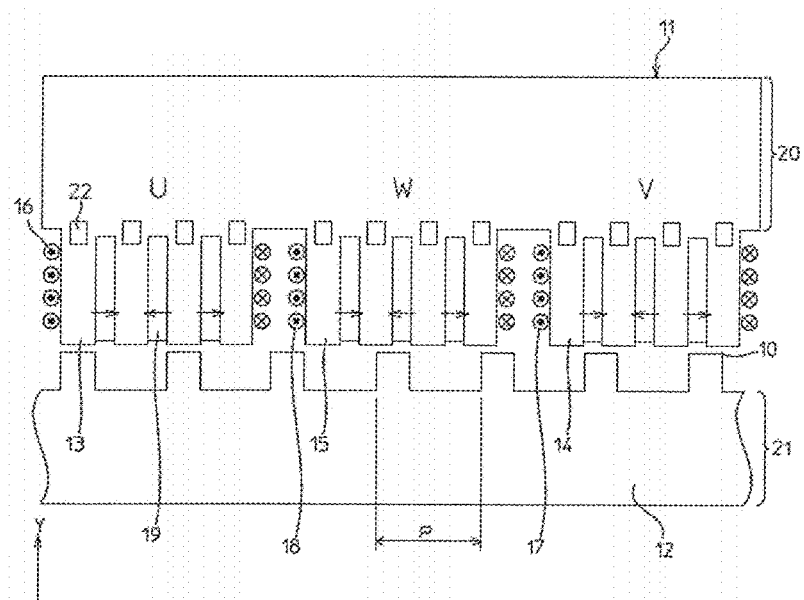
FIG. 1 illustrates a schematic structure of a linear motor.

FIG. 1 illustrates a schematic structure of a linear motor. In the drawings, the X-axis direction indicates a travel direction of a mover 11, and the Y-axis direction indicates a direction orthogonal to the travel direction. A stator 12 is formed, for example, by laminating electromagnetic steel plates. The stator 12 includes a stator magnetic yoke 21 which is long in the X-axis direction, and also includes a plurality of salient poles 10 protruding from an end surface of the stator magnetic yoke 21 in the Y-axis direction. The plurality of the salient poles 10 are arranged in the X-direction at intervals of pitch P.

The mover 11 is formed, for example, by laminating magnetic steel plates, and faces the stator 12 in the Y-axis direction. The mover 11 includes a mover magnetic yoke 20, teeth 13 for U-phase, teeth 14 for V-phase, and teeth 15 for W-phase. The teeth for the three phases 13, 14, and 15 are arranged such that they are relatively displaced by an electric angle of 120 degrees; that is, by one-third of pitch P of the salient poles 10 in the X-axis direction. Three-phase alternating current windings 16, 17, and 18 for the U, V, and W phases, respectively, are wound around the teeth 13, 14, and 15. The teeth of the same phase are arranged at one half of pitch P with permanent magnets 19 disposed in gaps, which serve as magnet insertion slots, between the teeth. The permanent magnets 19 having the same phase are arranged such that the magnetization direction of each permanent magnet 19 is opposite that of an adjacent permanent magnet 19. Arrows in FIG. 1 indicate the magnetization directions of the permanent magnets 19.

At the base of each tooth of the plurality of teeth 13, 14, and 15, a magnetic flux barrier 22 made of a non-magnetic material is disposed to reduce the inductance of the windings. The magnetic flux barrier 22 is disposed completely within the width of each tooth of the teeth 13, 14, and 15 in the X-axis direction, and is disposed near the center of each tooth of the teeth 13, 14, and 15 in the X-axis direction. As is clear from FIG. 1, the magnetic flux barrier 22 is spaced apart from the adjacent permanent magnet 19 in the X-axis direction, forming a small gap between the magnetic flux barrier 22 and the adjacent permanent magnet 19.

Figure 2:
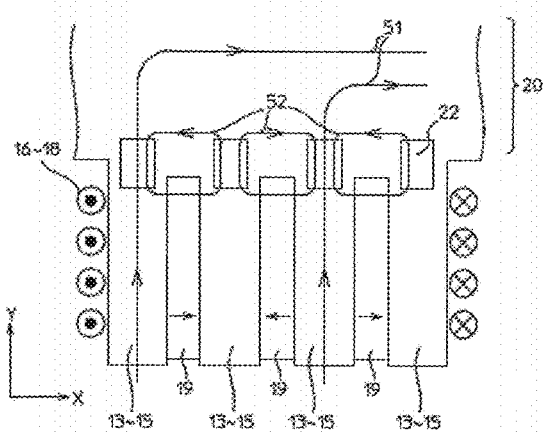
FIG. 2 illustrates magnetic fluxes of the linear motor.

Here, the action of the magnetic flux barrier 22 is explained with reference to FIG. 2. FIG. 2 illustrates the structure of the mover 11 corresponding to one electrical phase by omitting the stator 12 and illustrating only one electrical phase of the mover 11. Magnetic flux generated in the mover 11 is illustrated in FIG. 2. Magnetic flux 51 is the magnetic flux generated when current is applied to the three-phase alternate current windings 16, 17, and 18. Magnetic flux 52 is the magnetic flux which is short-circuited from the N-pole to the S-pole at end portions of the permanent magnets 19. The magnetic flux barriers 22 are disposed to block the passage of such magnetic fluxes 51 and 52. When the passage of the magnetic flux 51 is blocked and the amount of magnetic flux is reduced, the inductance of the windings decreases. This enhances the responsiveness of the linear motor and increases the thrust force in the high speed range. In addition, since the magnetic flux 52 is a useless magnetic flux, not affecting the generation of the thrust force, the amount of the magnetic flux that effectively acts in generating the thrust force increases by the amount of the decrease of the magnetic flux 52, so that the thrust force per volume of the linear motor can be increased.

In the present embodiment, the mover magnetic yoke 20 is not separated from the teeth 13, 14, and 15 by the magnetic flux barriers 22. This prevents cost increase in manufacturing the linear motor and also prevents an increase of thrust ripples due to deterioration of assembly accuracy.

Furthermore, in the present embodiment, since the magnetic flux barriers 22 are disposed completely within the width of each tooth of the teeth 13, 14, and 15 in the X-axis direction, the magnetic flux barriers 22 do not affect the Y-axis dimension of the permanent magnets 19. Thus, the dimension of the permanent magnets 19 is not affected by the magnetic flux barriers 22, so that the thrust force per volume of the liner motor can be increased.

Furthermore, each permanent magnet 19 does not contact the magnetic flux barrier 22 with the gap formed therebetween, so that the effective magnetic flux can flow into and out of the permanent magnet without being blocked even when the magnetic flux barrier is present. As a result, the magnetic flux of the permanent magnet 19 can be effectively used for the generation of the thrust force, so that the thrust force per volume of the linear motor can be increased.

When the magnetic flux barriers 22 are disposed across the mover magnetic yoke 20 and the teeth 13, 14, and 15, as illustrated in FIG. 1, the area occupied by the magnetic flux barriers 22 in the mover magnetic yoke 20 can be decreased as compared to the case where the magnetic flux barriers are disposed only in the mover magnetic yoke 20. If a large area of the mover magnetic yoke 20 is occupied by the magnetic flux barriers 22, magnetic saturation tends to occur in the mover magnetic yoke 20 during generation of the thrust force of the linear motor, causing a decrease of generated thrust force. By disposing the magnetic flux barriers 22 across the mover magnetic yoke 20 and the teeth 13, 14, and 15, the thrust force per volume of the linear motor can be increased.

The dimension of the magnetic flux barriers 22 in the direction orthogonal to the travel direction of the mover 11 may be larger than the dimension of the magnetic flux barriers 22 in the travel direction of the mover 11. The larger the dimension of the magnetic flux barriers 22 in the direction orthogonal to the travel direction of the mover 11, the larger the magnetic resistance of the magnetic flux barriers 22 to the magnetic fluxes 51 and 52. Thus, the passage of the magnetic fluxes 51 and 52 can further be intercepted. This improves the responsiveness of the linear motor, increases the thrust force in the high speed range, and increases the thrust force per volume of the linear motor.

Figure 3:
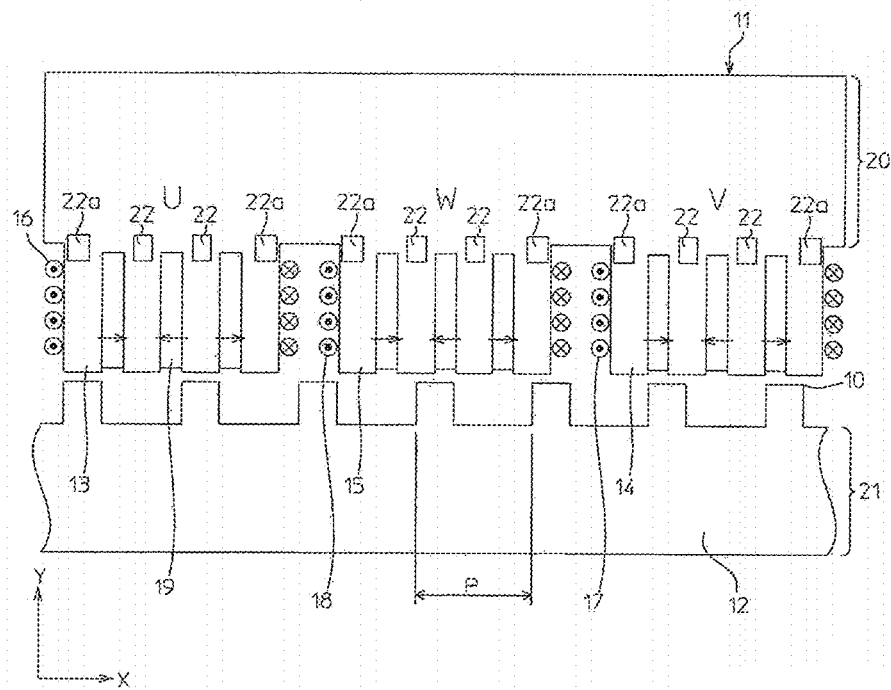
FIG. 3 illustrates a schematic structure of another linear motor.
Figure 4:
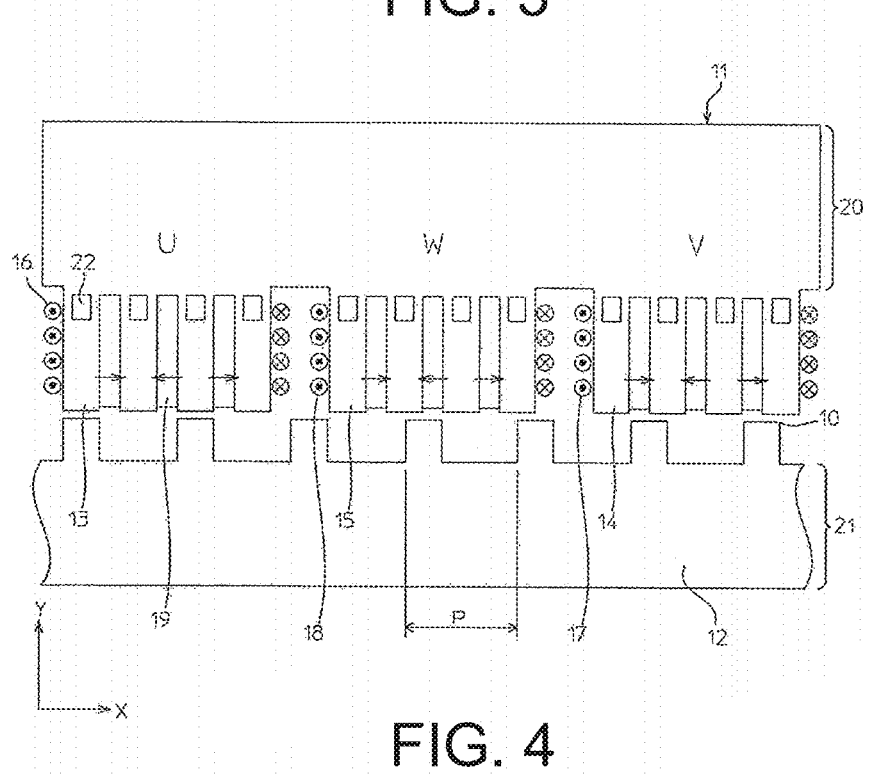
FIG. 4 illustrates a schematic structure of another linear motor.
Figure 5:
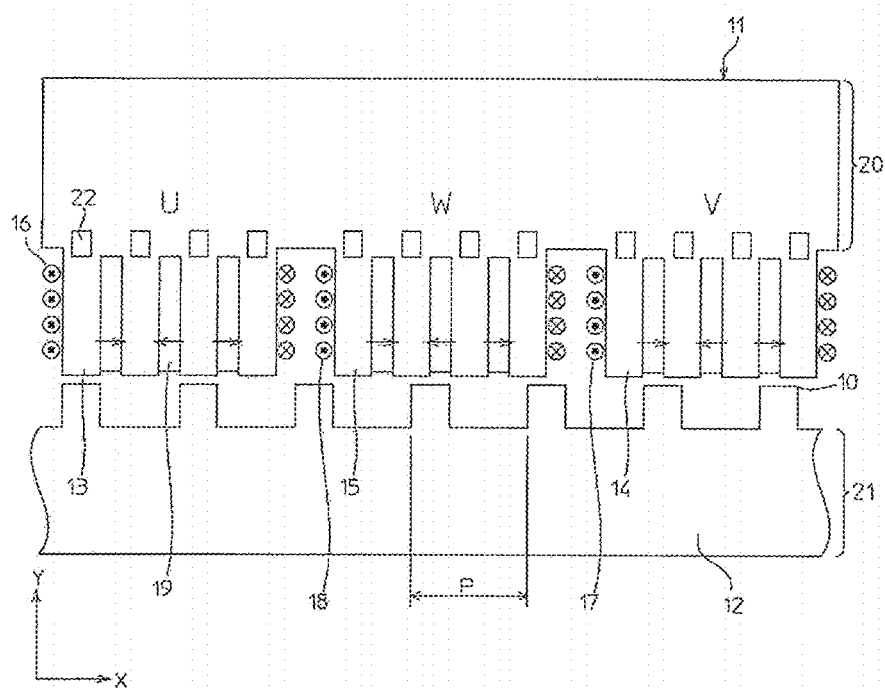
FIG. 5 illustrates a schematic structure of another linear motor.
Figure 6:
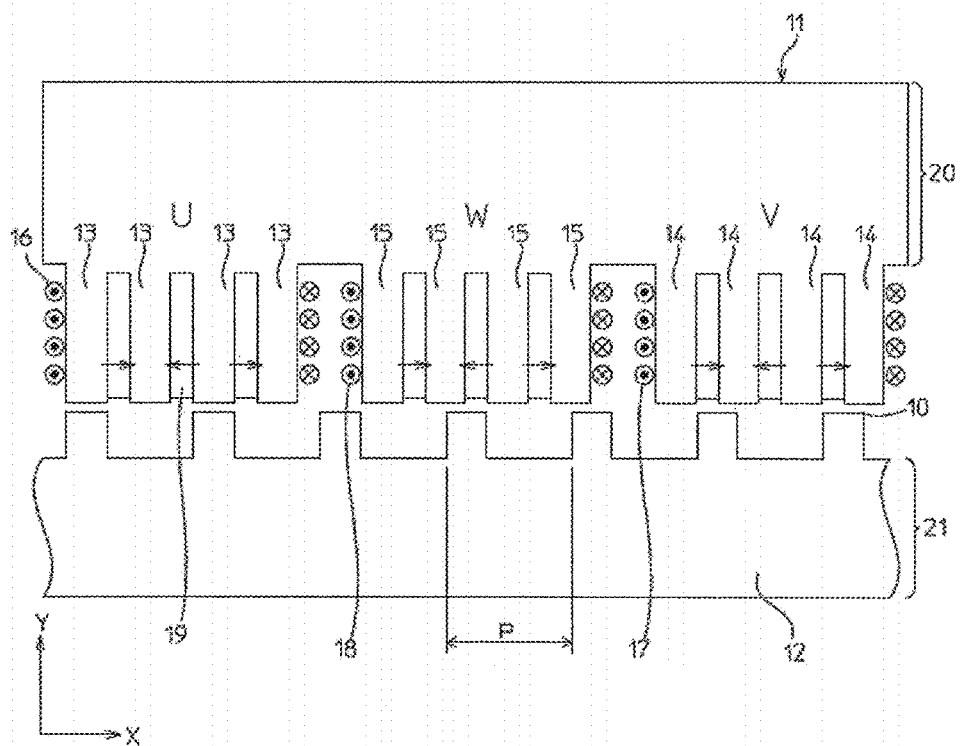
FIG. 6 illustrates a schematic structure of a conventional linear motor.
Figure 7:
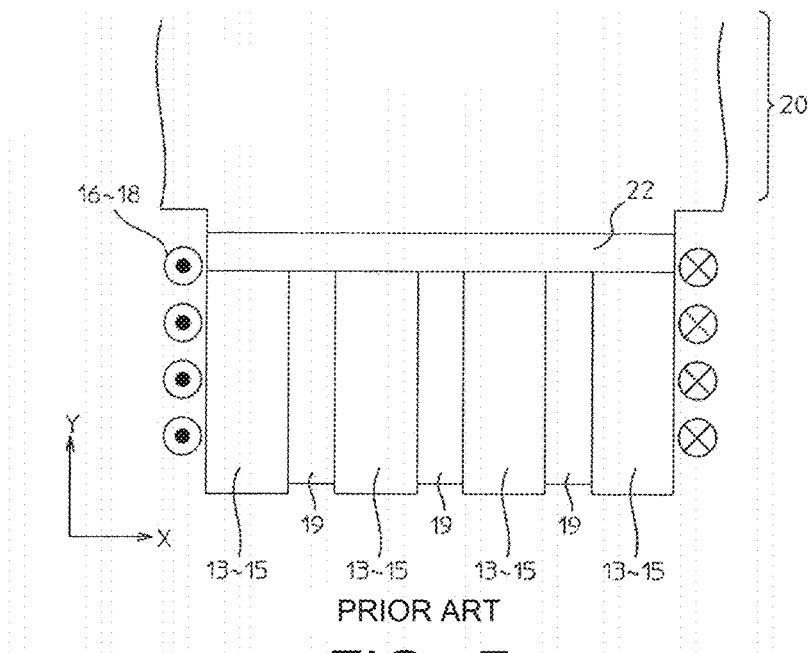
FIG. 7 illustrates the structure of a mover of another conventional linear motor corresponding to one electrical phase.
Figure 8:
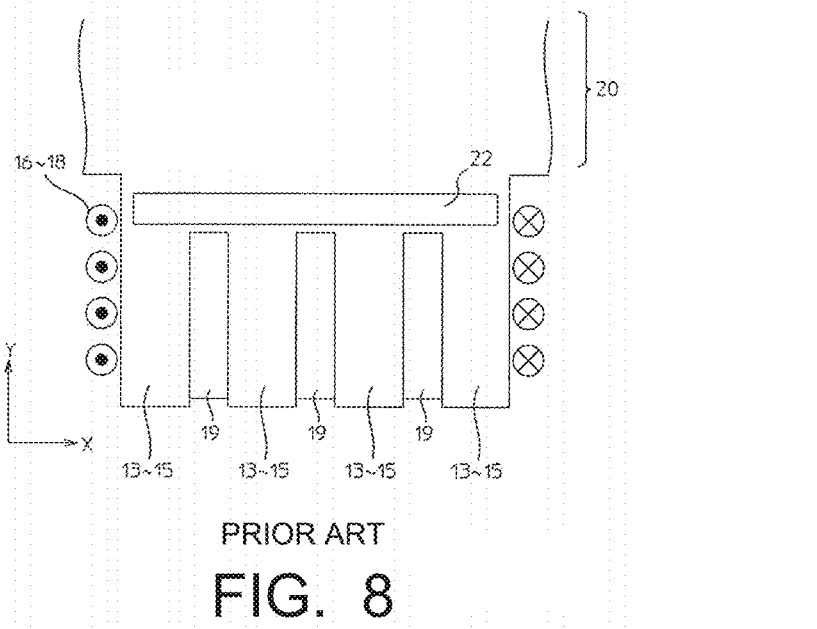
FIG. 8 illustrates the structure of a mover of another conventional linear motor corresponding to one electrical phase.
Figure 9:
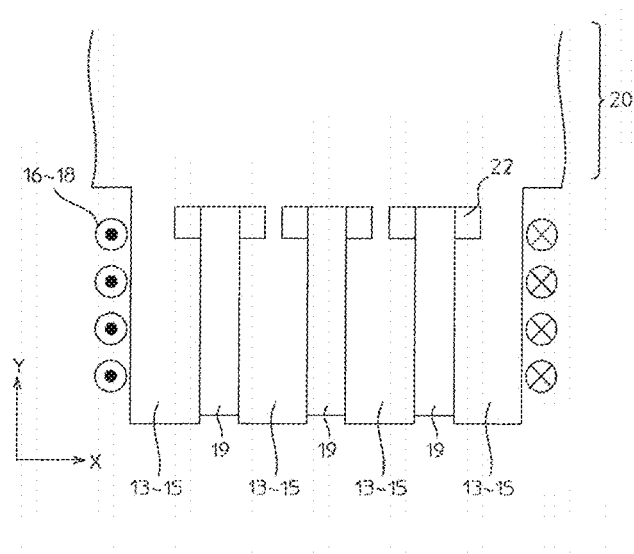
FIG. 9 illustrates the structure of a mover of another conventional linear motor corresponding to one electrical phase.

The above-described structure has been given as an example, and various changes may be made to the structure on the condition that each magnetic flux barrier 22 is disposed completely within the width of each tooth of the teeth 13, 14, and 15 in the X-axis direction, disposed near the base of each tooth of the teeth 13, 14, and 15 in the X-axis direction, and spaced apart from each permanent magnet 19 in the X-axis direction. For example, as illustrated in FIG. 3, some of the magnetic flux barriers 22a, when they are spaced apart from the permanent magnets 19 in the X-axis direction, may be biased in the X-axis direction from the center of each tooth of the teeth 13, 14, and 15 in the X-axis direction. Alternatively, the magnetic flux barriers 22 may not be disposed across the mover magnetic yoke 20 and the teeth 13, 14, and 15, when the magnetic flux barriers 22 are disposed near the base of the teeth 13, 14, and 15. Accordingly, the magnetic flux barriers 22 may be disposed in such a manner that their Y-axis range is completely included within the Y-axis range of the teeth 13, 14, and 15, as illustrated in FIG. 4. Alternatively, the magnetic flux barriers 22 may be disposed completely outside the Y-axis range of the teeth 13, 14, and 15, so that no magnetic flux barriers 22 are present in the teeth 13, 14, and 15, as illustrated in FIG. 5.

REFERENCE SIGNS LIST

11 Mover
12 Stator
13, 14, 15 Teeth
16, 17, 18 Three-phase alternate current winding
19 Permanent magnet
20 Mover magnetic yoke
21 Stator magnetic yoke
22 Magnetic flux barrier
51, 52 Magnetic flux

The invention claimed is:

1. A linear motor, comprising:
a stator including a plurality of salient poles arranged at regular intervals in a predetermined travel direction; and
a mover movable in the travel direction and facing the stator in a facing direction orthogonal to the travel direction, wherein
the mover includes
a plurality of teeth arranged in the travel direction,
three-phase alternate current windings wound around the teeth,
a mover magnetic yoke that connects the plurality of teeth extending from an edge of the mover magnetic yoke in the facing direction,
permanent magnets each extending from the edge of the mover magnetic yoke in the facing direction and disposed in a gap between the teeth of identical phase, and
magnetic flux barriers each embedded near the base of each tooth of the plurality of teeth, disposed completely within a width of each tooth in the travel direction, and spaced apart from the permanent magnet in the travel direction,
wherein the magnetic flux barriers are disposed across the mover magnetic yoke and the teeth so that a portion of the magnetic flux barrier overlaps the mover magnetic yoke and a remaining portion of the magnetic flux barrier overlaps the teeth, and
wherein the magnetic flux barriers have a dimension in the travel direction that is smaller than a dimension of the teeth in the travel direction.

2. The linear motor according to claim 1, wherein
a dimension of the magnetic flux barriers in the facing direction is larger than a dimension of the magnetic flux barriers in the travel direction of the mover.

3. The linear motor according to claim 1, wherein
each of the magnetic flux barriers is disposed at the center of each tooth in the travel direction.

* * * * *